W. H. FULTON.
Stump-Elevators.
No. 156,151. Patented Oct. 20, 1874.
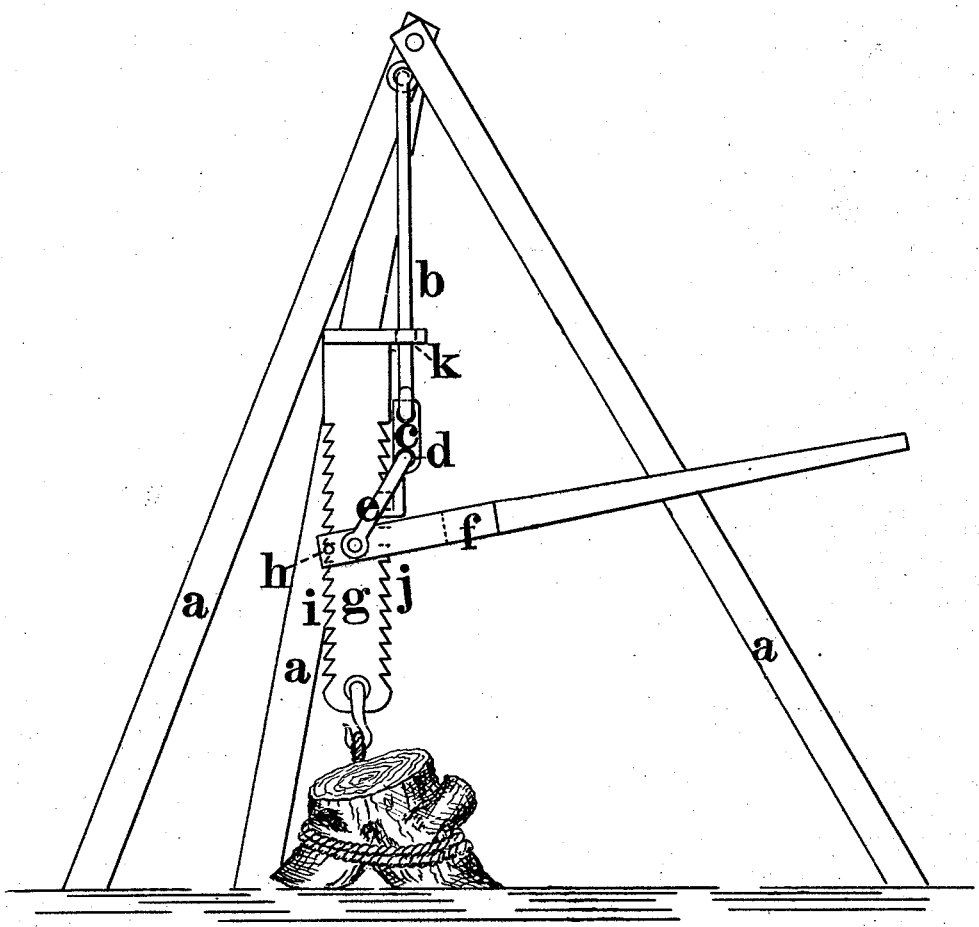
Witness.
Inventor.
Per Atty.

UNITED STATES PATENT OFFICE.

WILLIAM H. FULTON, OF FOXCROFT, MAINE.

IMPROVEMENT IN STUMP-ELEVATORS.

Specification forming part of Letters Patent No. 156,151, dated October 20, 1874; application filed September 18, 1874.

*To all whom it may concern:*

Be it known that I, WILLIAM H. FULTON, of Foxcroft, in the county of Piscataquis and State of Maine, have invented certain new and useful Improvements in Stump-Extractors; and I do hereby declare that the following is a full, clear, and exact description thereof, that will enable others skilled in the art to which it appertains to make and use the same, reference being had to the accompanying drawings, forming a part of this specification, in which is shown a side elevation of my invention.

My invention consists of a machine for extracting stumps, rocks, &c. It is also applicable to some other purposes, when a powerful strain is required. It consists of a rack-bar provided with teeth on each side, so combined with a suspended lever and pawl that the bar is raised by the action of said lever, which at the same time forces the pawl into engagement with one set of the teeth of the rack-bar, and retains it in its raised position. A rod is used to suspend the devices, which at the same time serves as a guide-rod for the rack-bar.

Reference to the drawing will explain my invention.

At $a$ is shown a frame of suitable construction, from which hangs a rod, $b$. To the lower end of this rod is attached a pawl, $c$, in such a manner as to allow it a swinging motion. Below the point of its attachment to the rod $b$ this pawl is provided with an eye, $d$, through which passes a yoke, $e$, its lower ends supporting and furnishing a fulcrum for the lever $f$. This lever is forked, and incloses a rack-bar, $g$, provided with teeth on each side. It is raised by means of a pin, $h$, passing from side to side of the lever $f$, and engaging the teeth upon one side, $i$, of the bar. The teeth upon the opposite side $j$ are engaged by the pawl above referred to.

The stump or weight to be lifted is attached to the lower end of the rack-bar, and by working the lever $f$ said bar is gradually raised, the pawl engaging and retaining it in place as it rises. The fulcrum-yoke being attached to the swinging pawl, as shown at a point below its point of suspension, the downward pressure of the lever upon the fulcrum tends to draw the pawl in toward the teeth of the rack-bar, insuring its engagement with them. The rack-bar is provided with an eye, $k$, at its upper end, through which the suspending-rod $b$ passes, thus serving as a guide-rod for the rack-bar in its vertical motion.

My devices are capable of other applications, as before stated, among which I may specify setting up the rigging of vessels. In such case the frame would not be employed, the rod $b$ being attached directly to the rigging to be tightened, and the rack-bar to some stationary point on the vessel, or vice versa.

What I claim as my invention, and desire to secure by Letters Patent, is—

1. The combination of the supporting-frame $a$, rod $b$, and suspended pawl $c$ with the yoke $e$ attached thereto, lever $f$, and rack-bar $g$, substantially as set forth.

2. The combination of the suspended pawl $c$, fulcrum-yoke $e$ attached thereto, lever $f$, and rack-bar $g$, as herein described.

3. The suspended pawl $c$, provided with an eye or like device for the reception of the fulcrum-yoke, in combination with the teeth of the rack-bar, substantially as and for the purposes set forth.

4. The rack-bar $g$, provided with an eye, $k$, in combination with the suspending-rod $b$, whereby said rod serves as a guide to said rack-bar.

In testimony that I claim the foregoing I have hereunto set my hand this 11th day of September, 1874.

WILLIAM H. FULTON.

Witnesses:
 W. E. BROWN,
 WM. FRANKLIN SEAVEY.